United States Patent [19]

Norling

[11] Patent Number: 5,031,987

[45] Date of Patent: Jul. 16, 1991

[54] FIBER OPTIC THERMAL SWITCH UTILIZING FRUSTRATED TOTAL INTERNAL REFLECTION READOUT

[75] Inventor: Brian L. Norling, Mill Creek, Wash.

[73] Assignee: Sundstrand Data Control, Inc., Redmond, Wash.

[21] Appl. No.: 459,927

[22] Filed: Jan. 2, 1990

[51] Int. Cl.⁵ ............................................. G02B 6/26
[52] U.S. Cl. .............................. 350/96.15; 350/96.29; 250/227.21; 250/231.19
[58] Field of Search ......................... 350/96.15, 96.29; 250/227.21, 231.19

[56] References Cited

U.S. PATENT DOCUMENTS

| | | | |
|---|---|---|---|
| 4,521,684 | 6/1985 | Gilby et al. | 250/227.21 |
| 4,588,886 | 5/1986 | Snider | 250/227.21 |
| 4,678,902 | 7/1987 | Perlin | 250/227.21 |
| 4,687,927 | 8/1987 | Iwamoto et al. | 250/227.21 |
| 4,703,174 | 10/1987 | Anderson et al. | 250/227.21 |
| 4,743,752 | 5/1988 | Olsen et al. | 250/227.21 |

Primary Examiner—John D. Lee
Assistant Examiner—John Ngo
Attorney, Agent, or Firm—Michael S. Yatsko

[57] ABSTRACT

A fiber optic transducer utilizes a single optical fiber having one end surface, disposed adjacent a sensor element, cut at an angle to result in frustrated total internal reflection. The end surface of the optical fiber is spaced away from the sensor element. As the sensor element is displaced with respect to the end surface of the optical fiber, the amount of light reflected from the sensor element varies. Light injected into the optical fiber is reflected back toward the light source until the element comes into relatively close proximity with the angled end of the optical fiber. When this occurs, a portion of the light is transmitted across the gap and absorbed by the sensor element. The ratio of the light reflected from the reflective surface to the total light input into the optical fiber produces a signal representative of the displacement of the sensor element. This signal can then be converted to a corresponding temperature or pressure signal and displayed at a remote location. The transducer is capable of being used with temperature or pressure sensitive elements to provide either an analog output signal or a digital output signal. Also disclosed is a self test circuit for the transducer.

15 Claims, 4 Drawing Sheets

FIBER OPTIC THERMAL SWITCH UTILIZING FRUSTRATED TOTAL INTERNAL REFLECTION READOUT

BACKGROUND OF THE INVENTION

Field of the Invention

The present invention generally relates to fiber optic transducers and more particularly, to a transducer utilizing a single optical fiber for detecting displacement of a deformable reflective surface with respect to the optical fiber, wherein the optical fiber is cut at an angle to result in frustrated total internal reflection.

Fiber optic transducers are used in many applications. For example, fiber optic transducers are particularly suited for sensing conditions, such as temperature and pressure in a hazardous environment containing explosive and flammable vapors and liquids, since such transducers do not generate electrical arcs as conventional electrical switches. Also, due to the relatively light weight of the optical fibers they are also suitable for weight constrained applications, such as aboard aircraft requiring relatively long runs to remote switches. Fiber optic transducers are also used for interfacing with optical logic devices.

Various fiber optic transducers are known in the art. Such transducers are generally used to sense conditions, such as pressure and temperature and provide an optical signal at a remote location which can be converted to an electrical signal and displayed. Both analog and digital fiber optic transducers are known.

Some known fiber optic transducers utilize two or more optical fibers. For example, Iwamoto et al U.S. Pat. No. 4,687,927 discloses a fiber optic pressure transducer. In this device, light is transmitted from a light source via a first optical fiber to a pressure responsive diaphragm having a reflective surface which reflects light as a function of the pressure applied to the diaphragm. The reflected light is applied to a second optical fiber which transmits the reflected light to a photosensitive element. In order to optimize the reflected light from the diaphragm, the end surfaces of the optical fibers are terminated with respect to the reflecting surface of the diaphragm at an oblique angle.

In Snider U.S. Pat. No. 4,588,886, a fiber optic transducer is disclosed for measuring temperature and pressure. This transducer utilizes a bundle of optical fibers, terminated such that the axes of the fibers are generally perpendicular to the reflected surface on the diaphragm.

The problem with such transducers utilizing two or more fibers is that such devices are relatively complex and require precision alignments at the reflective surfaces and the adjoining fibers. Such devices are also relatively more expensive and more complex; inherently reducing the reliability of the system.

Optical transducers utilizing single optical fibers are also known. For example, Perlin U.S. Pat. No. 4,678,902 discloses a fiber optic transducer utilizing a single optical fiber. In this transducer, the geometry of the fiber is altered in such a manner to allow light exiting the fiber to project onto a reflected surface in an expanded cone. In one embodiment this is achieved by bending the optical fiber adjacent its exit end. In another embodiment, the axis of the optical fiber is terminated so as to be relatively parallel to the plane of the reflective surface. The end of the optical fiber is then cut at an angle to cause light reaching the end surface to be reflected back into the optical fiber, rather than being allowed to exit the end surface. The reflective light then exits the circumference of the optical fiber. Such a fiber optic transducer requires relatively close control of the geometry of the optical fiber with respect to the sensing element.

Anderson et al U.S. Pat. No. 4,703,174 also discloses a fiber optic transducer, which utilizes a single optical fiber. Both a pressure sensitive transducer and a temperature sensitive transducer are disclosed. The pressure sensitive transducer includes a pressure sensitive piston, disposed in a cylindrical cavity within the sensor housing. A cylindrical carrier element is disposed within the sensor housing which moves coaxially with respect to the piston. A reflective surface is disposed on one end of the carrier adjacent the optical fiber.

The Anderson et al patent also discloses a temperature sensitive fiber optic transducer. In this embodiment, a pair of bimetallic strips are longitudinally disposed within a cylindrical housing. The bimetallic strips are attached at the top to a cylindrical carrier. The other ends of the bimetallic strips are anchored to the bottom of the transducer housing. As the temperature sensor is exposed to heat the bimetallic strips bow inwardly. This causes the cylindrical carrier to move axially within the cylindrical housing.

In both embodiments, a reflective surface is disposed on one end of the carrier adjacent the fiber optic cable. As the carrier moves toward and away from the optical fiber, the amount of light reflected back into the optical fiber from the reflective surface varies. This change in reflectance is used to determine the temperature or pressure.

A transducer, such as disclosed in the Anderson et al patent, is relatively complicated and requires precise alignment of the components over time, even though the transducer may be exposed to shock and vibration. Also, initial alignment may involve relatively expensive procedures and require the use of relatively close tolerance components.

Other fiber optic transducers are known which use polarization techniques. However, these transducers require polarization retaining fibers which are generally more costly and require control of the angular alignment during the assembly process. Other known trandsducers utilize nonpolarization retaining fibers which are sensitive to bends and stresses which affect the polarization. Moreover, either of the two fibers must be aligned or reflective element used to modulate the output signal using polarization.

In other known fiber optic transducers, which utilize snap acting bimetallic discs, the optical fibers are often attached directly to the disc. This creates several problems associated with stresses caused by bending, which can affect the stability of the attachment joint which, in turn, affects the switch point accuracy. Also there are relatively high dynamic forces involved when switching such a snap acting disc which can affect both the radial and axial alignment of the optical fiber.

SUMMARY OF THE INVENTION

It is an object of the present invention to resolve the problems associated with fiber optic transducers known in the art.

It is a further object of the present invention to provide a fiber optic transducer which utilizes a single optical fiber.

It is a further object of the present invention to provide a fiber optic transducer which will remain in relatively precise alignment over time and is relatively unaffected by shock and vibration.

It is another object of the present invention to provide a relatively low cost fiber optic transducer.

It is yet a further object of the present invention to provide a fiber optic transducer which, in one embodiment, utilizes a snap acting disc and is relatively unaffected by the dynamic forces involved in switching the disc from one position to another.

Briefly, the present invention relates to a fiber optic transducer and, in particular, a transducer capable of utilizing various types of displacement type sensor elements for sensing conditions, such as pressure or temperature. An important aspect of the invention relates to the use of a single optical fiber having one end, disposed adjacent the sensor element, cut at an angle to result in frustrated total internal reflection. As the sensor element is displaced with respect to the angled end of the optical fiber, the amount of light reflected from the sensor element varies. More specifically, all light injected into the optical fiber is reflected back toward the light source until the sensor element comes into relatively close proximity with the angled end of the optical fiber. When this occurs, a portion of the light is transmitted across the gap and absorbed by the sensor element thus decreasing the amount of reflected light. The ratio of the reflected light to the total input light produces a signal representative of the displacement of the sensor element. This signal can then be converted to a corresponding temperature or pressure signal and displayed at a remote location. The transducer is capable of being used with various displacement type sensor elements, such as temperature or pressure sensitive elements, and can provide either an analog output signal or a digital output signal.

BRIEF DESCRIPTION OF THE DRAWING

The invention and its attendant advantages will be better understood by reference to the following detailed description in connection with the accompanying drawing wherein.

DETAILED DESCRIPTION

Figures 1, 2:
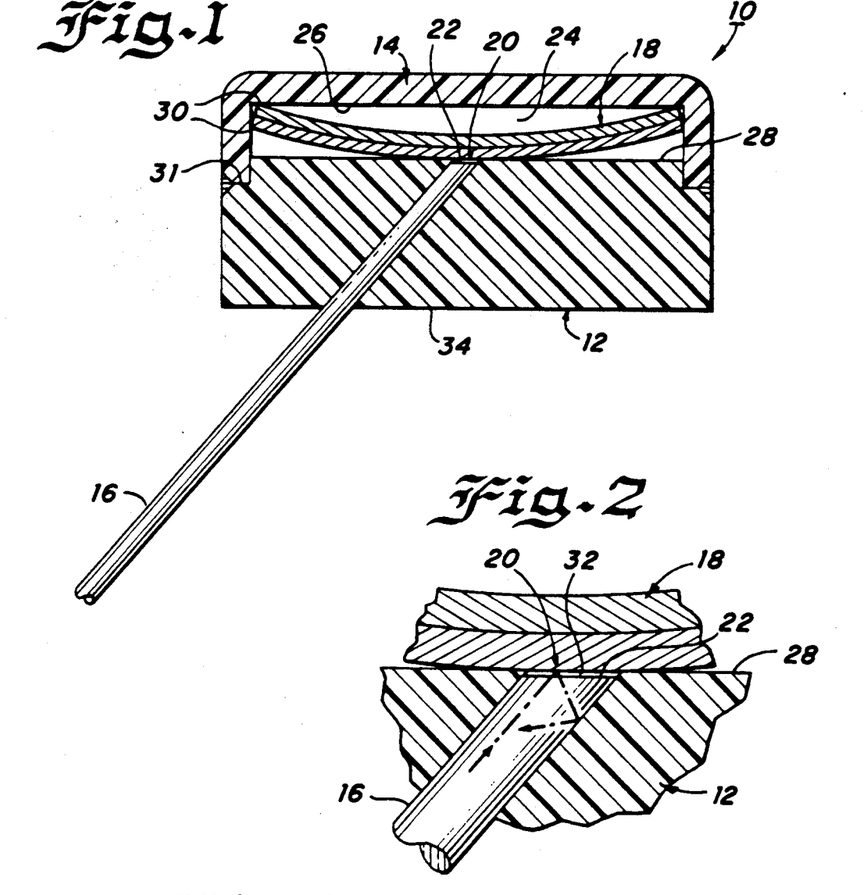
FIG. 1 is a sectional view of a fiber optic transducer in accordance with the present invention.
FIG. 2 is an exploded sectional view of a portion of the fiber optic transducer of FIG. 1, illustrating the clearance between the optical fiber and the sensor element.
Figure 10:
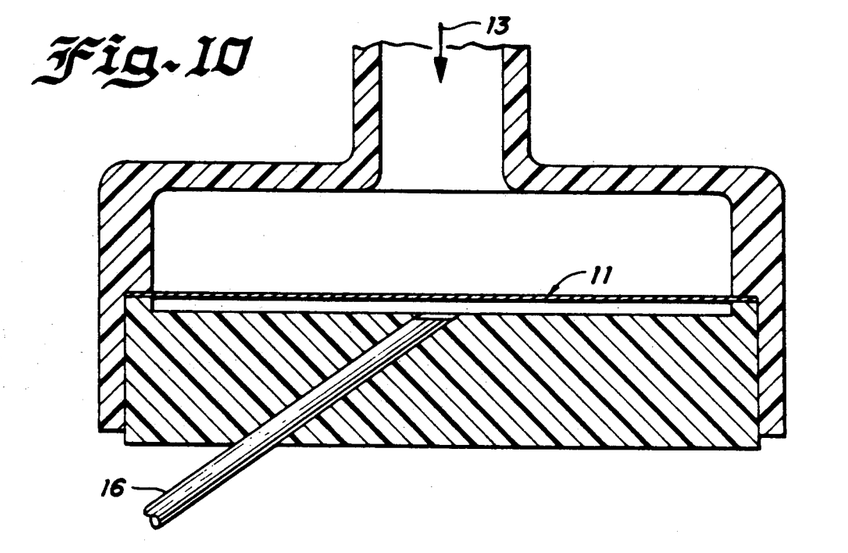
FIG. 10 is a sectional view of a fiber optic pressure transducer in accordance with the present invention.

The present invention relates to a fiber optic transducer, able to detect the displacement of various displacement type sensors, such as a pressure or temperature sensors, with respect to the end of an optical fiber and provide a signal representative of the displacement. This displacement can be converted to a corresponding temperature or pressure representative signal by known techniques. For example, in a pressure switch embodiment, such as illustrated in FIG. 10, a diaphragm 11, formed from a homogeneous metal, is used as a sensor element and exposed on one side (or both sides for differential pressure measurements) to a source of pressure as indicated by the arrow 13. The diaphragm deforms as a function of the pressure and causes displacement of the diaphragm with respect to the end of the optical fiber. In a temperature switch embodiment, such as illustrated in FIG. 1, a bimetallic cupped disc or magnet latched bimetallic strip, for example, may be used and exposed to a source of heat. The bimetallic disc is displaced with respect to the end of the optical fiber in response to heat. In both embodiments, the displacement of the sensor elements with respect to the end of the optical fiber is determined and converted to a corresponding temperature or pressure signal in the form of light reflected back to the light source. Since the principles of the invention apply equally to most any displacement type sensor elements, for simplicity the following description will be limited primarily to transducers with temperature responsive sensor elements.

Referring to FIG. 1, a fiber optic temperature transducer, generally identified by the reference numeral 10, is illustrated. The transducer 10 includes a base 12, a cover 14, a single optical fiber 16 and a temperature sensitive sensor element 18.

Figure 4:
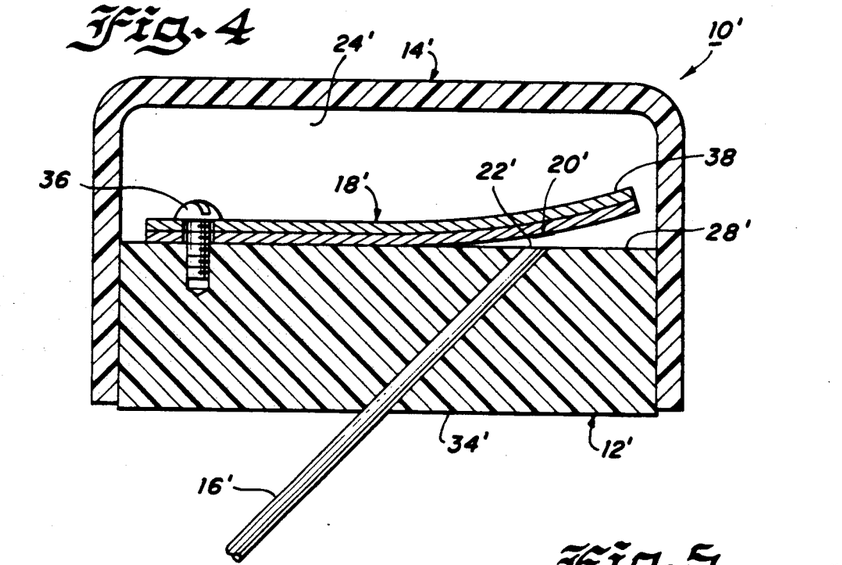
FIG. 4 is a sectional view of an alternative embodiment of a fiber optic transducer in accordance with the present invention which provides an analog output signal.
Figure 5:
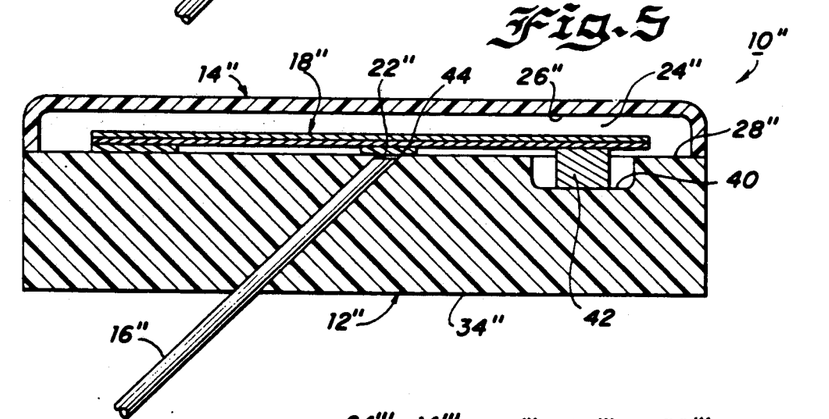
FIG. 5 is a sectional view of another alternative embodiment of a fiber optic transducer in accordance with the present invention, utilizing a magnetically latched bimetallic thermal sensor.
Figure 6:
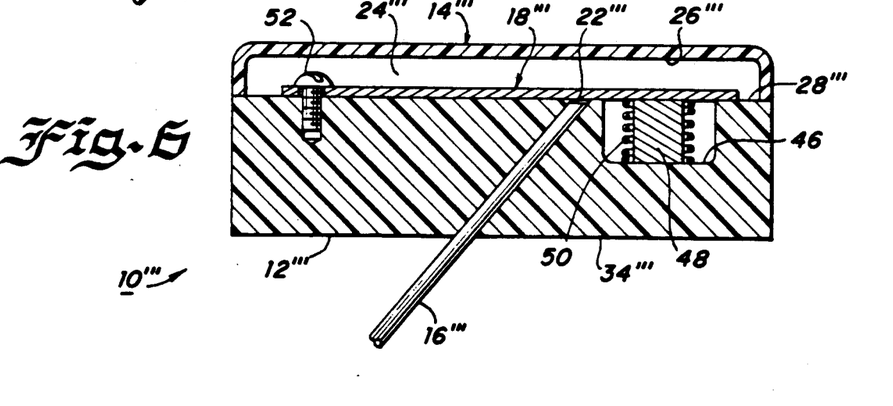
FIG. 6 is a sectional view of another alternative embodiment of the fiber optic transducer in accordance with the present invention, utilizing a magnetic flux actuated sensor.

Various displacement type temperature sensitive sensor elements may be used in practicing the invention. For example, FIG. 1 illustrates a snap acting disc sensor element for providing a digital output signal. FIG. 4 illustrates a bimetallic strip for providing an analog output signal. FIG. 5 illustrates the use of a magnetically latched bimetallic strip. Lastly, FIG. 6 illustrates a magnetic flux actuated optical thermal switch. Each of the aforementioned sensor elements 18 include a reflective surface or active point 20, that is displaced with respect to the end surface 22 of the optical fiber 16 as a function of temperature. The principles of the present invention are intended to include the use of all such sensor elements which provide a displacement as a function of temperature or other condition being sensed.

Referring back to FIG. 1, the temperature sensitive sensor element 18 is illustrated as a bimetallic snap acting disc. Such sensor elements 18 generally have two stable states and an intermediate unstable state. The transition between the two stable states occurs rapidly at a predetermined set point, determined by the design of sensor element 18 and is subject to hysteresis. In such an embodiment, the fiber optic transducer 10 in accordance with the present invention is thus able to provide a signal representative of when the temperature is above or below a predetermined set point. Such an embodiment is generally used in applications where it is unnecessary to know the exact temperature or when it is desirable to minimize the number of on/off switching cycles of a controlled source, such as a heating or cooling unit.

As shown in FIG. 1, the sensor element 18 is disposed within the temperature transducer 10 such that the active portion 20 will be displaced relative to the end surface 22 of the optical fiber 16 as a function of temperature. More specifically, the bimetallic disc 18 is captured within a cavity 24 formed between the inside surface 26 of the cover 14 and the top surface 28 of the base 12. The height of the cavity 24 is such to hold the bimetallic disc 18 in relatively close contact with the top surface 28 of the base 12 when the temperature sensitive element 18 is in its undeformed state. The width of the cavity 24 is such that peripheral contact points 30 of the bimetallic disc 18 engage the inside surface 26 of the cover 14 to prevent movement of the active point 20 with respect to the end of the fiber optic cable 22.

In order to facilitate assembly and alignment of the assembly, the top surface 28 of the base 12 is provided with an annular step 31 for receiving the cup shaped cover 14. By accurately forming the annular step 31 and the cavity 24, the active point 20 of the sensor element 18 will be rather accurately and permanently aligned with respect to the base 12 and the end surface 22 of the optical fiber 16 when the transducer 10 is assembled.

The cover 14, once the bimetallic disc 18 is inserted into the device, may be attached to the base 12 by various means including laser welding. By constructing the transducer 10 in such a manner, the bimetallic disc 18 will be held in relatively firm contact with the top surface 28 of the base 12 to avoid false temperature indications due to shock and vibration.

Since the principle of operation of the transducer is based upon the displacement of the active surface 20 with respect to the end surface 22 of the optical fiber 16, it is necessary that the end surface 22 of the optical fiber 16 be fixed with respect to the top surface 28 of the base 12. This may be accomplished by various techniques including casting the optical fiber 16 into the base 12. The optical fiber 16 may be cast into the base 12, such that the end surface 22 of the optical fiber 16 extends slightly upwardly from the top surface 28 of the base 12 forming a contact surface, or the top surface 28 of the base may be lapped flat such that the end surface 22 of the optical fiber 16 does not protrude upwardly from the top surface 28 of the base 12. The optical fiber 16 may then be etched back, for example, 0.1 microns, below the top surface 28 of the base 12 to avoid direct contact with the active point 20 of the bimetallic disc sensor element 18. This etching can be accomplished with hydrofluoric acid or other solutions which do not attack the base material. However, if a contact material is used having a relatively low Young's modulus coefficient, then it may be desirable to etch the surface of the base 12 with an etchant that does not attack the fiber to allow the fiber to extend above the base surface 28 to insure contact with the moving part. The active point 20 on the bimetallic disc should have a relatively flat surface in the contact position. By setting back the end surface 22 of the optical fiber 16 with respect to the top surface 28 of the base 12, physical contact between the bimetallic disc sensor element 18 and the optical fiber 16 is avoided. This reduces the sensitivity of the transducer 10 to forces resulting from additional bending of the bimetallic disc 18.

An important aspect of the invention relates to the use of an optical fiber 16 cut at an angle at the end surface 22 to result in frustrated total internal reflection. More particularly, the end surface 20 of the optical fiber 16 is cut at an angle other than at 90 degrees with resect to the axis of the optical fiber. As best shown in FIG. 2, the end surface 22 of the optical fiber 16 is terminated proximate and planar with respect to the top surface 28 of the base 12. The angle is selected to result in internal reflection such that little or no light is transmitted and therefore absorbed by the active point 20 on the sensor element 18. More particularly, when the end surface 22 is cut at such an angle, most, if not all, of the light transmitted into the optical fiber 16 is reflected back into the optical fiber 16 until the active point 20 of the sensor element comes in relatively close proximity, for example, less than 633 nanometers from the end surface 22 of the optical fiber 16. When this occurs, a portion of the light is transmitted across the gap 32, between the end surface 22 of the optical fiber 16 and the active point 20 on the temperature sensitive element, and is absorbed by the sensor element 18 thus reducing the total amount of light reflected back into the optical fiber 16. The ratio of the reflected light to the total input light provides a signal representative of the displacement of the sensor element 18 with respect to the end surface 22 of the optical fiber 16. Since the displacement of the temperature sensitive sensor element 18 is a function of temperature, this output signal may be readily converted to an equivalent temperature pressure or other sensed condition by known methods.

Figure 3:
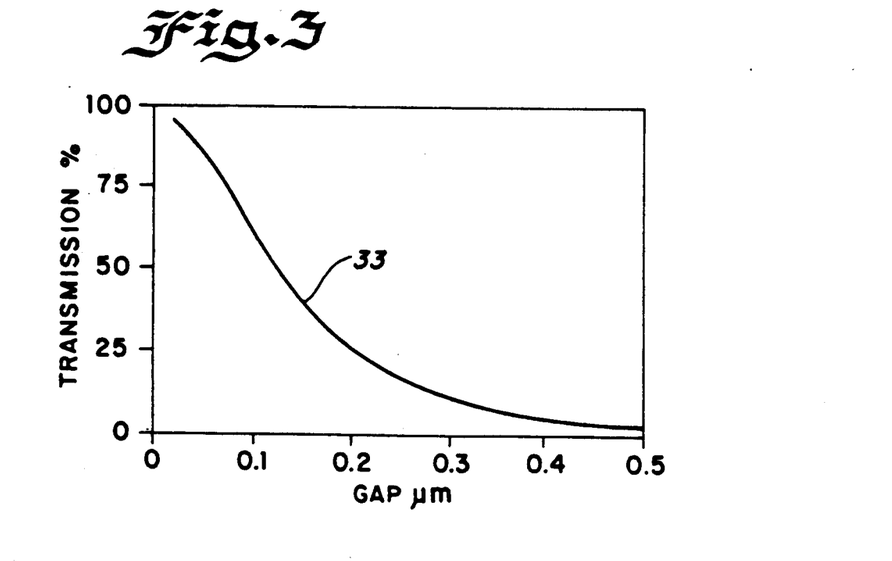
FIG. 3 is a graph of transmittance out of the optical fiber as a function of the distance between the end of the optical fiber and the sensor element.

The principles of the invention are more easily understood with reference to the graph in FIG. 3. The vertical axis represents the transmittance of light across the gap 32 as a percentage of the amount of light available at the end surface 22 of the optical fiber 16. The horizontal axis represents the magnitude of the gap 32 in micrometers. The curve 33 represents the relationship between the transmittance across the gap 32 as a function of the gap width. At relatively large gaps, a very small portion of light is transmitted across the gap 32. In this situation, most of the light at the end surface 22 of the optical fiber 16 is reflected back into the optical fiber 16. At relatively smaller gaps, for example, less than 0.3 micrometers, the transmittance increases almost linearly with the reduction in the gap. Thus, as the active point 20 of the temperature sensor element 18 is brought into relatively close contact with the end surface 22 of the optical fiber 16, a relatively large portion of the light is transmitted across the gap and absorbed by the sensor element 18.

The curve 33, illustrated in FIG. 3, is a function of the angle that the optical fiber 16 is cut, the wavelength of the light used as a light source, the refractive index of the mediums and the absorption coefficient of the sensor element 18. Since the sensitivity curve 33 is dependent on various parameters, this allows the option of adjusting the sensor set point, having multiple set points or selecting the amount of hysteresis in the signal without modifying the sensor element 18. Adjusting the signal processing trigger level as a ratio of the input light intensity to the output light intensity is all that is required. For example, the wavelength of the input light could be changed to vary the sensitivity without modifying the construction of the fiber optic transducer 10.

FIG. 4 illustrates an alternative embodiment of the present invention which utilizes an analog temperature sensor element 18. In the description of this embodiment, like numerals with primes will be used to identify components which are similar to components in FIG. 1. This embodiment differs from the embodiment illustrated in FIG. 1 in that it is unnecessary for the base 12' and the cover 14' to be formed to position and capture the temperature sensor element 18' within the cavity 24'. The base 12' is formed with a relatively rectangular cross-section. Although it is not critical to the practice of the invention, FIG. 4 illustrates the cover 14' extended downwardly to a bottom surface 34' of the base 12'. The optical fiber 16' is cast into the base member 12', similar to the embodiment illustrated in FIG. 1. The sensor element 18' comprises a bimetallic strip, secured at one end by a fastener 36 to the base 12'. The end surface 22' of the optical fiber 16' is disposed adjacent a free end 38 of the sensor element 18', as opposed to near the center of the base 12 as in FIG. 1. The sensor element 18' contains an active point 20', aligned with the end surface 22' of the optical fiber 16'. The active point 20' is displaced with respect to the end surface 22' as a function of temperature. Unlike the snap acting disc as disclosed with respect to FIG. 1, the use of a bimetallic strip for a sensor element provides an analog output signal as a function of the temperature. This type of embodiment would be utilized in an application where a continuous readout of the temperature is required.

Various other embodiments are also intended to be within the spirit and scope of the present invention. For example, FIG. 5 illustrates a fiber optic transducer 10" which utilizes a magnetically latched bimetallic thermal strip as a sensor element. In this embodiment, like components will be identified with a double prime. This fiber optic transducer 10" includes a base 12" and a coextensive cover 14", affixed to the top surface 28" of the base 12" by suitable means. The optical fiber 16" is disposed in the base 12", similar to the embodiment of in FIG. 1. The sensor element 18" is comprised of a bimetallic strip attached at one end to the base 12". A well 40 is formed in the top surface 28" of the base 12", proximate one end. The well 40 receives a magnet 42. The magnet 42 projects upwardly above the top surface 28" and engages the one end of the sensor element 18".

The magnet 42 reduces the sensitivity of the fiber optic transducer 10" to shock and vibration. In operation, the bimetallic strip in response to temperature, opposes the non-linear magnetic attraction forces caused by the magnet 42, and displaces the active point 20" from the end surface 22" of the optical fiber 16" as a function of temperature. A light absorbing elastomeric pad 44 is disposed on the underside of the sensor element 18", adjacent the end surface 22" of the optical fiber 16". The elastomeric pad 44 is formed from a material having a relatively low Youngs modulous coefficient. Use of such a material reduces the sensitivity of the fiber optic transducer 10" to pressure resulting from the contact between the temperature sensitive sensor element 18" and the optical fiber 16" and reduces the sensitivity of the fiber optic transducer to shock and vibration.

In another alternative embodiment, illustrated in FIG. 6, a magnetic flux actuated optical thermal switch is illustrated. In this embodiment like components will be designated with a triple prime. The transducer 10'" includes a base 12'", a cover 14'", fastened to the top surface 28'" of the base 12'" defining a cavity 24'". A well 46 is in the top surface 28'" of the base 12'" adjacent one end. A magnet 48, surrounded by a spring 50, is disposed in the well 46. The sensor element 18'" is fastened at one end to the base 12'" by a suitable fastener 52. The free end of the sensor element 18'" is disposed adjacent the well 46. The temperature sensitive element, used as a sensor element 18'", is formed from a soft magnetic material, lapped flat with respect to the upper surface 28'" of the base 12'". The casting of the optical fiber 16'" with respect to the base 12'" is as previously described. In this embodiment, the magnet 48 holds the soft magnetic material by magnetic attraction forces. The spring 46 applies a linear opposing force to the temperature sensitive sensor element 18'". As the temperature changes the amount of flux varies, thereby changing the magnitude of the non-linear magnetic attraction forces with respect to the opposing spring forces to allow the temperature sensitive sensor element 18'" to be displaced with respect to the top surface 28'" of the base 12'" as a function of temperature. Upon the further displacement of the temperature sensitive element 18", the decrease in the non-linear magnetic attraction forces becomes much more rapid than the linear spring force causing the element to be bistable. When the displacement of the temperature sensitive sensor element 18" reaches a predetermined point, it will snap back.

Figure 7:
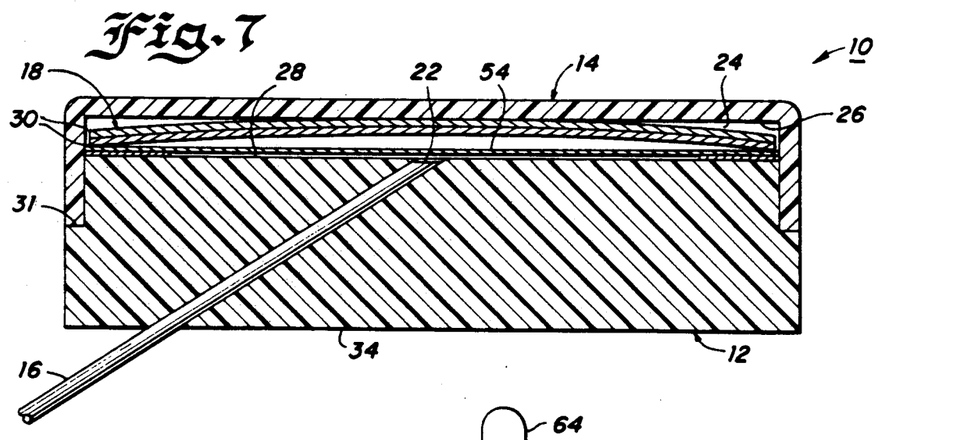
FIG. 7 is a sectional view of a fiber optic transducer in accordance with the present invention utilizing a contamination barrier interlayer.

In order to prevent false triggering of a snap acting type transducer and to prevent errors in a continuous output type transducer, it is necessary to prevent the optical fiber 16 from being coated with moisture and possibly affect the refractive index of the optical fiber 16. Accordingly, the bond between the optical fiber and the base material may be made hermetic. Also, a contamination barrier interlayer 54 is disposed between the top surface 28 of the base 12 and the sensor element 18, as illustrated in FIG. 7. Contamination could cause failures of at least two types. In the first type, contamination particles prevent intimate contact with the optical surface. In the second type, contamination particles on the optical surface cause false optical coupling of the light out of the fiber.

Figure 8:
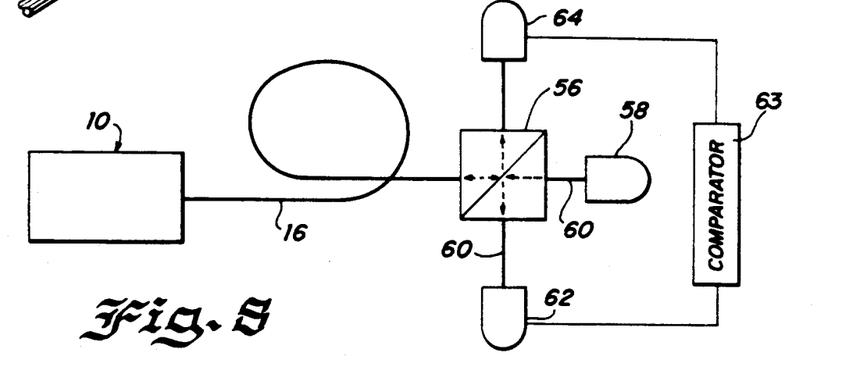
FIG. 8 is a block diagram representation of a system for implementing the fiber optic transducer in accordance with the present invention.

A typical implementation of a fiber optic transducer 10 in accordance with the present invention is illustrated in FIG. 8. The fiber optic transducer 10 is connected by way of a single optical fiber 16 to a beam splitter 56. Also connected to the beam splitter 56 is a source of light 58, optically coupled to the beam splitter 56 by suitable means, such as another optical fiber 60. A reference beam detector 62 is also optically coupled to the beam splitter 56 by way of an optical fiber 60. Light intensity from the light source 58 is applied to the reference beam detector 62 as well as to the fiber optic transducer 10 by way of the optical fibers 60 and 16, respectively. The reference beam detector 62 measures the light intensity of the input source 58 of light. Reflected light from the optical transducer 10 is reflected by way of the beam splitter 56 to the output beam detector 64. The light intensity received at the output beam detector 64 is compared with a reference signal from the reference beam detector 62 by a comparator 63 to determine the total amount of light reflected by the optical transducer 10. The resulting signal is representative of the amount of displacement of the sensor element 18 in the transducer with respect to the end surface 22 of the optical fiber 16 which, in turn, is representative of the temperature or pressure sensed by the fiber optic transducer 10. This signal may be converted to an electrical signal and displayed, either locally or remotely. In a simpler form of the detector which relies on absolute light level generation, losses and detection, the reference detector 62 can be eliminated.

Figure 9:
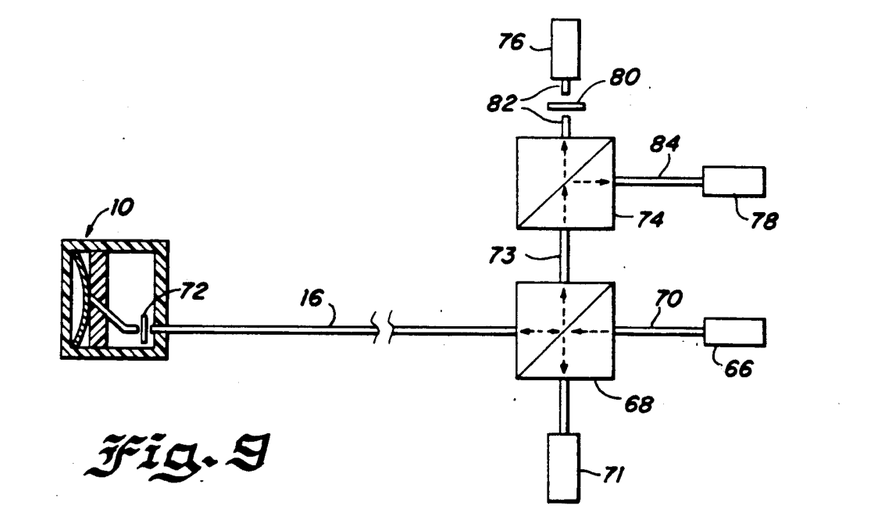
FIG. 9 is a block diagram representation of a self-test system for the fiber optic transducer in accordance with the present invention.

In order to insure that the fiber optic transducer 10 is providing an output signal and that the optical fiber 16 is not broken, it may be desirable to provide a self-test circuit. One such self-test circuit is illustrated in FIG. 9. In this circuit, a light source 66 is optically coupled to a first beam splitter 68 by way of an optical fiber 70. The beam splitter 68 reflects a portion of the light from the light source 66 to a reference beam detector 71. The beam splitter 68 also allows a portion of the light from the light source 66 to be transmitted through the optical fiber 16 to the fiber optic transducer 10. A filter 72 is disposed at the transducer end of the optical fiber 16 to alter the wavelength of the light with respect to the source beam from the light source 66. The filter 72 may be, for example, an optical notch filter for removing one wavelength from the incoherent light from the light source 68. The light reflected from the optical transducer 10 is reflected back to the beam splitter 68 by way of the optical fiber 16 and reflected to a second beam splitter 74 by way of an optical fiber 73. The beam splitter 74 is a 50% splitter, which reflects about half of the light from the beam splitter 68 to a first detector 76 and the other half to a second detector 78. Another optical filter 80 is disposed between the first detector 76 and the beam splitter 74. This filter 80 may be an optical notch filter, for removing the same wavelength of light as the filter 72. The detector 76 and the beam splitter 74 are optically coupled to the filter 80 by way of optical fibers 82. The second detector 78 is optically coupled to the beam splitter 74, directly by way of an optical fiber 84.

Figure 11:
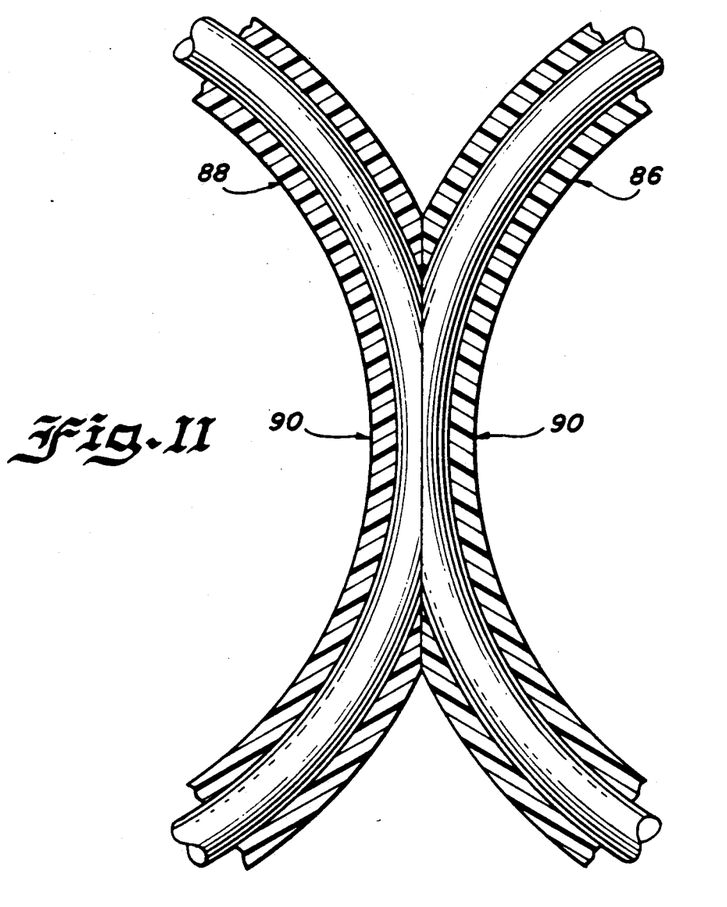
FIG. 11 is a sectional view of the beam splitter illustrated in FIGS. 8 and 9.

Although various embodiments of optical beam splitters are contemplated for the optical beam splitters 56, 68 and 74, one such embodiment is illustrated in FIG. 11. In this embodiment, two optical fibers 86, 88 are utilized. The optical fibers 86, 88 are joined together at one portion and share a common cladding 90.

In order to account for the effects of attenuation of a relatively long length of fiber optic cable, it is also contemplated that a second optical fiber be disposed adjacent and co-extensive with the first optical fiber 16. The second optical fiber may be used as a reference, connected to electrical circuitry (not shown) to adjust the transducer 10 output to account for attenuation due to relatively long cable runs.

In the operation of the self-testing system, as shown in FIG. 9, light from the light source 66 is reflected through the beam splitter 68 to the optical transducer 10 by way of the optical fiber 16. The light reflected back from the optical transducer 10 has, for example, one wavelength removed, by the filter 72. The reflected light from the optical transducer is then reflected by way of the beam splitters 68 and 74 to the first detector 76 and the second detector 78. The light reflected to the first detector 76 is filtered by the filter 80. If the fiber optic transducer 10 is operating properly and the optical fiber 16 is not broken, the detectors 76 and 78 will produce virtually identical output signals. If a problem exists, the outputs of the detectors 76 and 78 will be different.

There are also various other ways to provide self-testing. For example, another approach is to cut the optical fiber at an angle that reflects one polarization of light and transmits another. This would permit polling of the optical transducers with two different polarizations of light to verify the connection. In a snap acting disc embodiment, another self-test option would be to heat the bimetallic snap acting disc by increasing the light intensity beamed down the filter. This would cause the snap acting disc to momentarily snap to its unstable position and then snap back after the intensity is reduced.

While the invention has been particularly shown and described with reference to specific embodiments, it will be understood by those of ordinary skill in the art that various other embodiments are contemplated to be within the spirit and scope of the present invention. For example, the principles of the invention relate to many types of displacement type sensor elements, such as a pressure and temperature sensor elements. All such embodiments are contemplated to be within the scope of the present invention.

I claim:

1. A fiber optic sensing system comprising
    a light source;
    a beam splitter, optically coupled to said light source;
    a reference beam detector, optically coupled to said beam splitter, for providing a signal representative of the light intensity at the light source;
    an output beam detector, optically coupled to said beam splitter, for providing a signal representative of reflected light;
    a fiber optic transducer, optically coupled to said beam splitter by a single optical fiber, which includes a sensor element that is displaced in response to an external stimulus and reflects light to said beam splitter as a function of the displacement; and
    means coupled to said reference beam detector and to said output beam detector for comparing the amount of light received by the reference beam and output beam detectors and for providing a signal representative of the position of said sensor element based on said comparison.

2. A fiber optic transducer as recited in claim 1, wherein said external stimulus is pressure.

3. A fiber optic transducer as recited in claim 1, wherein said external stimulus is temperature.

4. A fiber optic system as recited in claim 1, further including means for self testing said fiber optic transducer.

5. A fiber optic system comprising:
    a light source for providing light at a plurality of wavelengths;
    a first beam splitter optically coupled to said light source;
    a reference beam detector, optically coupled to said first beam splitter, for providing a signal representative of the light intensity at the light source;
    a second beam splitter, optically coupled to said first beam splitter;
    a fiber optic transducer, optically coupled to said first beam splitter, which reflects light to said first beam splitter as a function of the magnitude of an external stimulus;
    a first optical filter, optically coupled between said fiber optic transducer and said first beam splitter, for altering the wavelength of the reflected light relative to the light source;

a first output detector, optically coupled to said second beam splitter, for providing a signal representative of a portion of the reflected light, a second output detector, optically coupled to said second beam splitter, for providing a signal representative of a portion of the reflected light; and a second optical filter, optically coupled between said second beam splitter and said second output detector for altering the wavelength of the reflected light.

6. A fiber optic system as recited in claim 5, wherein said second beam splitter is a 50 percent beam splitter.

7. A fiber optic system as recited in claim 5, wherein said first optical filter is disposed within said fiber optic transducer.

8. A fiber optic system as recited in claim 5, wherein said first optical filter comprises an optical notch filter.

9. A fiber optic system as recited in claim 5, wherein said second optical filter comprises an optical notch filter.

10. A fiber optic system as recited in claim 5, wherein said fiber optic transducer includes a displacement type sensor element that is displaced in response to said external stimulus.

11. A fiber optic system as recited in claim 5, wherein said fiber optic transducer is optically coupled to said first beam splitter by a single optical fiber.

12. A fiber optic system as recited in claim 5, wherein said external stimulus is pressure.

13. A fiber optic system as recited in claim 5, wherein said external stimulus is temperature.

14. A fiber optic system as recited in claim 5, wherein said fiber optic transducer provides an analog output signal in response to said external stimulus.

15. A fiber optic system as recited in claim 5, wherein said fiber optic transducer provides a digital output signal in response to said external stimulus.

* * * * *